F. W. GORE.
AIRCRAFT.
APPLICATION FILED AUG. 13, 1917.
1,272,797.
Patented July 16, 1918.
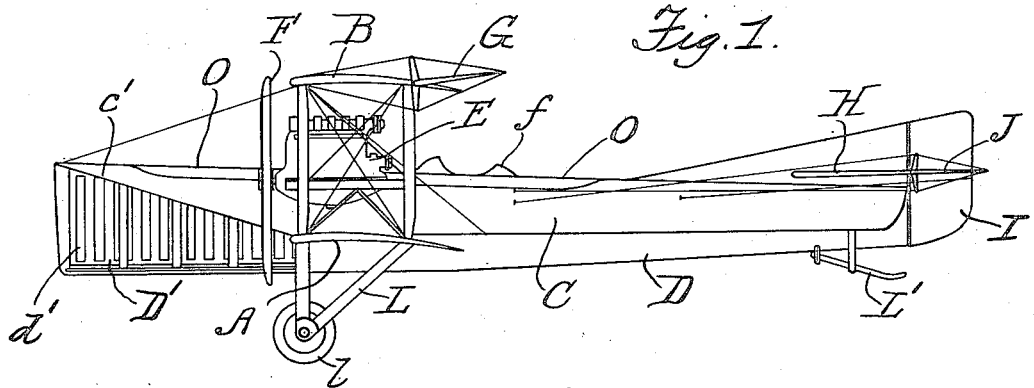
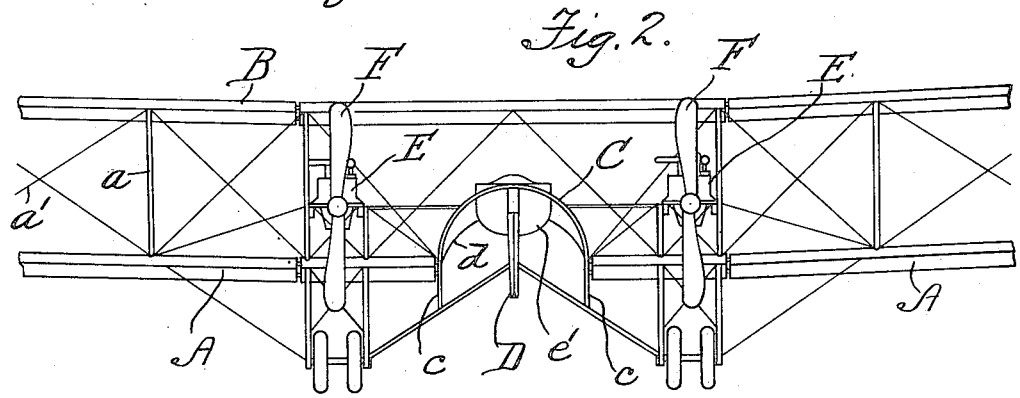
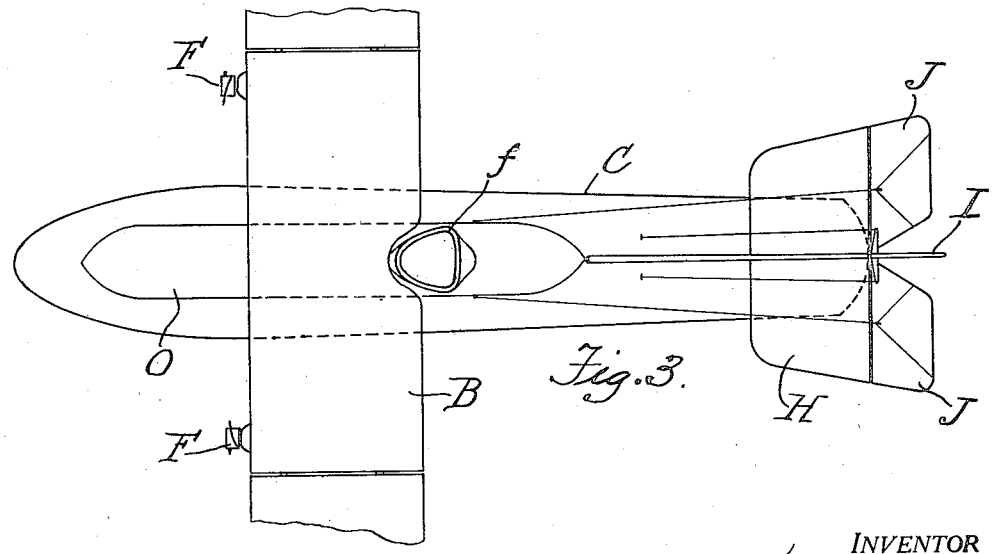
INVENTOR
Fred.ᵏ W. Gore.
BY
H. J. Bernhard
Attorney

UNITED STATES PATENT OFFICE.

FREDERICK W. GORE, OF HUNTINGTON, NEW YORK.

AIRCRAFT.

1,272,797.   Specification of Letters Patent.   Patented July 16, 1918.

Application filed August 13, 1917. Serial No. 185,808.

*To all whom it may concern:*

Be it known that I, FREDERICK W. GORE, a citizen of the United States, residing at Huntington, county of Suffolk, and State of New York, have invented a certain new and useful Aircraft, of which the following is a specification.

This invention is an aircraft, the objects in view being, first, to eliminate that tendency of the craft when in flight, and particularly at high altitudes, to develop that tendency of rotation about an imaginary vertical axis which in the aviation art has come to be known as the "tail spin"; second, to prevent side slip of the machine, by which term is meant that tendency of the craft to move in a lateral direction when about to make a turn and which is occasioned by a tilting movement of the craft beyond a predetermined angle when in the act of turning from a straight course; third, to establish a long gliding angle in the movement of the craft and in a forward direction so that in the event of disability of the power plant the aircraft is capable of descending and thus enable the occupant or occupants to alight with safety; and, fourth, to overcome any tendency of the craft to capsize from adverse wind pressure or other causes.

A machine incorporating means for the attainment of the foregoing ends possesses the stability desired, and in fact necessary, in a craft intended for purposes of instructing students and others in the art of aerial navigation; in addition to which the craft is capable of the various uses, from a naval or military standpoint, as well as for other purposes, desired in an aircraft. It may be stated that a craft of the present invention is so designed that its several planes mutually contribute to the work of sustaining the load in such a manner as to secure that end known in the aviation art as flotation, thus rendering it possible to utilize the energy of the power plant in overcoming head resistance, whereby it is possible to secure great speed when in flight.

A salient feature of the invention consists in combining with a plurality of planes positioned one above the other of a third plane of concavo-convex form in cross section, the lower side and the front and rear ends of which cross sectionally curved plane are open for the free ingress and egress of air. Said cross sectionally curved plane is positioned intermediate the members composing the lower plane and at a proper distance below the upper plane, and said three planes mutually contribute to the work of sustaining the load of the craft while in flight and thus to attain that important factor in the aviation art known as "flotation".

In this connection it is proper to state that the cross sectionally curved plane is semi-circular, or substantially so, at the forward open end, but rearwardly of said forward end portion the plane is a segment of a circle, or in other words, the plane is tapering longitudinally, as a result of which the under curved surface of the plane presents an angle of incidence when the machine is in horizontal flight, the angle of incidence being two and one-half degrees ($2\frac{1}{2}°$) more or less. This is important for the reason that the air flowing within the shell when the craft is in flight is compressed by the tapering form of said shell and thus a vacuum is not formed at the rear of the machine when in rapid flight.

Other features and advantages of the invention will appear from the following detailed description taken in connection with the drawings.

In the drawings,

Figure 1 is a side elevation of an aircraft embodying the invention.

Fig. 2 is a front elevation thereof.

Fig. 3 is a plan view of a part of the machine.

In the construction of the aircraft a plurality of superposed planes A B and a cross sectionally curved plane C are employed, said plane C extending in the direction of the length of the craft and being positioned below the upper plane B and intermediate the members composing the lower plane A. The shell C is open at its under side, as clearly shown in Fig 2, and is open, also, at the front and rear thereof, whereby air is free to flow within the shell when the aircraft is in flight.

The plane A is shown as consisting of a plurality of members, some of which extend from one side of the shell C, and others from the opposite side of said shell C, all the members of the plane A being in the same horizontal plane and across the craft. The upper plane B consists of a plurality of members disposed in the same horizontal plane and extending crosswise of the craft, the upper and lower planes being retained in their proper positions relatively to each other by suitable struts $a$ and braces $a'$ in a manner well understood by those skilled in the art.

The cross sectionally curved plane is semi-circular at the forward open end portion thereof, the respective sides $c$ of the plane C depending below the lower plane A, as shown clearly in Fig. 2, but at said forward portion the plane C is inclined or beveled, as at $c'$, see Fig. 1. Rearwardly of the semi-circular forward part of the cross sectionally curved plane C the plane is a segment of a circle, as indicated at $d$ in Fig. 2, and by reason of the variation in the cross sectional curvature of the plane C, the latter is given a tapering form in the direction of its length, whereby the under curved surface of the plane presents an angle of incidence when the machine is in horizontal flight. The forward open part of the plane C is wider than the rear portion of said plane, as shown in Fig. 3, whereby a longitudinal taper is given to the plane, which taper in conjunction with the inclined under surface of the plane, due to the variation in the curvature, acts upon the air flowing within the plane to compress the air when the machine is in flight, as a result of which the rapid forward flight of the machine does not produce a vacuum rearwardly of the craft.

D designates a vertical plane depending centrally from the cross sectionally curved plane C, said plane D extending lengthwise of the plane C, and the depth of said plane D exceeding the diameter of said curved plane C, whereby the lower portion of plane D is exposed below the edge portions of the plane C, as clearly shown in Figs. 1 and 2. This plane D acts as a stabilizing plane when the craft is in flight, and the forward part of this plane D is exposed below the inclined edges $c'$ of plane C, in which exposed forward portion is provided a series of vertical slots $d'$ adapted to be closed by a shutter D'.

The aircraft is constructed with appliances usual in the art, and it is shown as being equipped with a power plant comprising motors E which are directly connected with the propellers F.

The upper plane B is provided with ailerons G, and at the rear of the craft there is provided the tail H, the rudder I and elevators or diving rudders J. The shell C is provided with a station $f$ for the accommodation of the aviator, and within the forward portion of this shell C is a cockpit $e'$.

In the machine shown, the frame is provided with a chassis L equipped with wheels $l$ so as to serve as the running gear, and at the rear of the machine is a landing skid L'. As is usual in the art, provision is made for the operation of the ailerons, the rudder and the elevators, but as these devices are ordinary in the art, it is not considered necessary to more particularly refer to them.

The planes A, B, C coöperate in sustaining the weight of the craft so that when it is in flight all the power of the engines is available in overcoming the head resistance, whereby the flotation afforded by the planes enables the full power of the engines to be used in securing rapid flight. My craft is characterized by an ability to carry considerable weights, and for naval or military purposes it is preferred to construct the craft with a deck O extending forwardly from the planes A, B and well to the rear of the aviator's station, indicated at $f$. This deck is available for use in mounting rapid fire guns forwardly of the aviator and, also, rearwardly, should it be so desired, but it is apparent that the armament may be dispensed with so that the deck is available for carrying passengers. In case the craft is armed for military or naval purposes, it is apparent that the military observer and the gunner may be protected by shields of Harveyized steel (not shown).

In case the craft is to be used for naval purposes, the running gear and the landing skids may be replaced by pontoons at the forward part of the craft and by a float at the rear part thereof.

Having thus fully described the invention, what I claim as new and desire to secure by Letters Patent is:—

1. An aircraft embodying a plurality of superposed planes and a cross sectionally curved plane positioned below the upper plane and extending forwardly and rearwardly beyond said superposed planes, said cross sectionally curved plane being open at the under side and at the respective ends thereof.

2. An aircraft embodying a plurality of superposed planes and a cross sectionally curved plane positioned below the upper plane and extending forwardly and rearwardly beyond said superposed planes, said cross sectionally curved plane tapering longitudinally and being open at the under side and at the respective ends thereof.

3. An aircraft embodying a plurality of superposed planes and a cross sectionally curved plane positioned below the upper plane and extending longitudinally of the craft, the under curved surface of the latter plane presenting an angle of incidence to the line of horizontal flight of the craft.

4. An aircraft embodying a plurality of superposed planes and a cross sectionally curved plane positioned below the upper plane and extending longitudinally of the craft, said latter plane tapering lengthwise and positioned for its under curved surface to present an angle of incidence to the line of horizontal flight of the craft.

5. An aircraft embodying a plurality of superposed planes and a cross sectionally curved plane positioned below the upper plane and extending longitudinally of the craft, said latter plane being open at the respective ends and on the underside thereof and the curvature at the rear portion of the plane being of increased radius relatively to the curvature at the front portion of said plane.

6. An aircraft embodying a plurality of planes positioned one above the other, a cross sectionally curved plane extending lengthwise of the craft, said latter plane being below the upper plane and intermediate the members composing the lower plane, and a stabilizing plane depending from the top arched portion of the cross sectionally curved plane for the lower edge portion of the stabilizing plane to be exposed below the lower plane and the side edge portions of said cross sectionally curved plane.

7. An aircraft embodying a plurality of planes positioned one above the other, a longitudinally extending plane of curved cross section positioned below the upper plane and interrupting the continuity of the lower plane, said cross sectionally curved plane being open at the respective ends and upon the under side thereof, and a platform carried by said cross sectionally curved plane at the upper side thereof.

In testimony whereof I have hereunto signed my name.

FREDERICK W. GORE.